Patented Sept. 5, 1933

1,925,746

UNITED STATES PATENT OFFICE 1,925,746

AZO-DYESTUFFS AND PROCESS OF MAKING SAME

Gérald Bonhôte, Basel, Switzerland, assignor to Society of Chemical Industry in Basle, Basel, Switzerland No Drawing. Application March 25, 1933, Serial No. 662,834, and in Switzerland April 11, 1932

16 Claims. (Cl. 260—95)

This invention relates to the manufacture of valuable new dyestuffs by coupling an arylide of 2:3-hydroxynaphthoic acid of the general formula

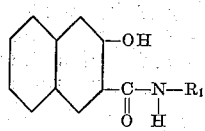

in which $R_1$ stands for a nucleus of the benzene or naphthalene series, with a diazo-compound obtained by diazotizing an arylether of the general formula

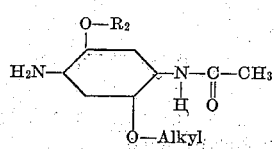

in which $R_2$ stands for a nucleus of the benzene series. The dyestuffs thus obtained correspond to the general formula

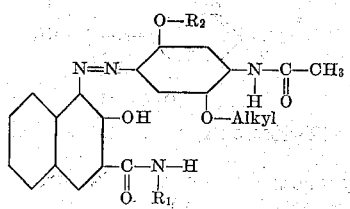

in which $R_1$ stands for a nucleus of the benzene or naphthalene series and $R_2$ for a nucleus of the benzene series. These dyestuffs form in a dry state dark powders, and dissolve in pyridine to violet solutions. When produced on cotton, they dye this fibre violet to blue-violet tints of excellent fastness, particularly to light, chlorine and kier-boiling.

The diazotizing components in question can in general be obtained, for example, by reducing a condensation product from 1-chloro-2-nitro-4-alkoxy-5-amino- or -acetyl-aminobenzene with phenol or its nuclear substitution products, such as ortho-, para- or meta-cresol, ortho-, para- or meta-chlorophenol, a chlorocresol, a dichlorophenol, a mono-alkylether of hydroquinone, resorcinol or pyrocatechol, chloroguaiacol, after acetylation of the free amino-group when necessary.

The following examples illustrate the invention, the parts being by weight unless otherwise stated:—

*Example 1*

27.2 parts of 2-amino-4-methoxy-5-acetylamino-1:1'-diphenylether are diazotized in the usual manner. The clear diazo-solution thus obtained is introduced into a solution consisting of 29.3 parts of 2:3-hydroxynaphthoic acid-para-anisidide, 60 parts of sodium hydroxide solution of 30 per cent. strength, 15 parts of anhydrous sodium carbonate and 2000 parts of water. The dyestuff thus formed, which corresponds very probably to the formula

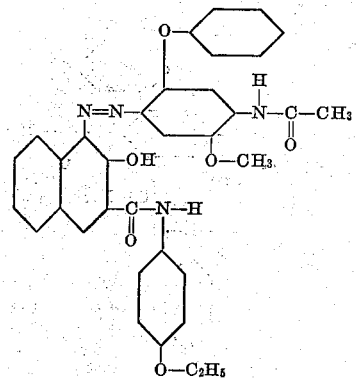

immediately separates. Its violet precipitate is filtered and dried.

*Example 2*

Cotton yarn is impregnated with a grounding liquor made by dissolving 6 kilos of 2:3-hydroxynaphthoic acid-2-methyl-4-methoxy-anilide in 300 cc. of hot water with addition of 12 cc. of sodium hydroxide solution of 30 per cent. strength and 8 cc. of Turkey red oil, and then diluting the whole to 1 litre. The yarn is then wrung out and developed in a neutralized solution containing 3 grams of 2-amino-4-methoxy-5-acetylamino-2'-methyl-1:1'-diphenylether. There is produced a pure violet of very good fastness, in particular of excellent fastness to light. The formula of the new dyestuff corresponds very probably to the formula

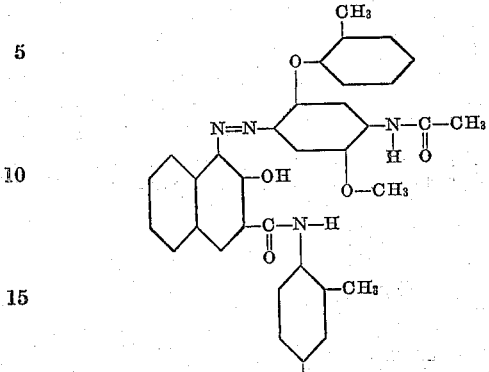

Similar violet tints are obtained with the 2:4-dimethoxy-5-chloranilide of 2:3-hydroxynaphthoic acid. Blue-violet tints are obtained with the para-anisidide of 2:3-hydroxynaphthoic acid.

Example 3

Wool yarn is impregnated with a solution of 7 grams of 2:3-hydroxynaphthoic acid-anilide, 14 cc. of a sodium hydroxide solution of 30 per cent. strength and 10 cc. of Turkey red oil per litre; it is then wrung out and developed in a diazo-solution, which has been neutralized with sodium bicarbonate and contains the diazo-compound from 3 grams of 2-amino-4:4'-dimethoxy-5-acetylamino-1:1'-diphenylether per litre. It is then rinsed and soaped. There is obtained a very pure violet tint of very good fastness. The formula of the new dyestuff corresponds very probably to the formula

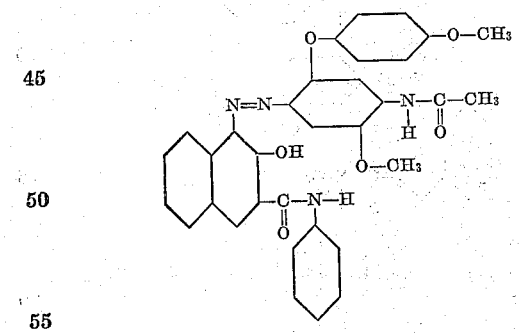

Similar violet tints are obtained with the para-anisidide of 2:3-hydroxynaphthoic acid.

Example 4

1 part of cotton yarn is impregnated with 25 parts of a solution of 7 grams of 2:3-hydroxynaphthoic acid-orthoanisidide, 14 cc. of a caustic soda solution of 30 per cent. strength, 10 cc. of Turkey red oil and 7 cc. of formaldehyde solution of 40 per cent. strength per litre, at 25–30° C. It is well wrung out and then developed in a neutralized solution containing 3 grams of diazotized 2-amino-4-methoxy-5-acetylamino-4'-methyl-1:1'-diphenylether per litre. Rinsing and soaping follow. There is obtained a bluish-violet tint of very good fastness. Violet tints are obtained with 2-methyl-4-methoxy-anilide of 2:3-hydroxynaphthoic acid. The formula of the new dyestuff corresponds very probably to the formula:

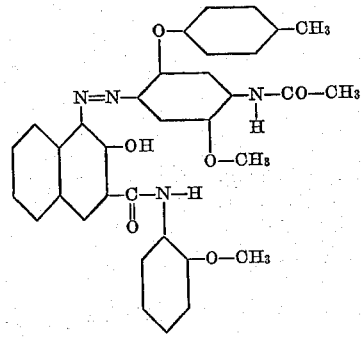

Similar violet tints of like excellent properties are obtained with diazotized 2-amino-4-methoxy-5-acetylamino-2'-chloro-1:1'-diphenylether and the β-naphthalide or the α-naphthalide or the 2:4-dimethoxy-5-chloranilide of 2:3-hydroxynaphthoic acid, or if the 2-amino-4-methoxy-5-acetylamino-2'-chloro-1:1'-diphenylether is replaced by the 2-amino-4-ethoxy-5-acetylamino-2'-chloro-1:1'-diphenylether.

Similar results are obtained in piece-dyeing or in printing. The dyestuffs may also be produced on other fibres, such as wool, silk or artificial silk, in which case, obviously, the mode of operation described in the preceding examples must correspondingly be altered as prescribed in the relevant literature (for instance patent application Serial No. 356,620).

What I claim is:—

1. A process for the manufacture of new azo-dyestuffs, consisting in coupling an arylide of 2:3-hydroxynaphthoic acid of the general formula

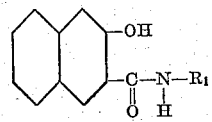

in which $R_1$ stands for a nucleus of the benzene or naphthalene series, with a diazo-compound obtained by diazotizing an arylether of the general formula

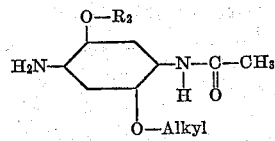

in which $R_2$ stands for a nucleus of the benzene series.

2. A process for the manufacture of new azo-dyestuffs, consisting in coupling an arylide of 2:3-hydroxynaphthoic acid of the general formula

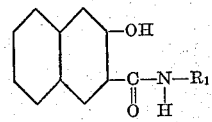

in which $R_1$ stands for a nucleus of the benzene or naphthalene series, with a diazo-compound obtained by diazotizing an arylether of the general formula

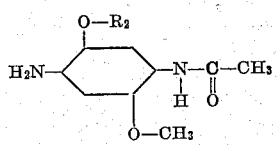

in which $R_2$ stands for a nucleus of the benzene series.

3. A process for the manufacture of new azo-dyestuffs, consisting in coupling an arylide of 2:3-hydroxynaphthoic acid of the general formula

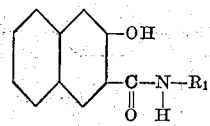

in which $R_1$ stands for a nucleus of the benzene series, with a diazo-compound obtained by diazotizing an arylether of the general formula

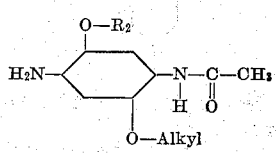

in which $R_2$ stands for a nucleus of the benzene series.

4. A process for the manufacture of new azo-dyestuffs, consisting in coupling an arylide of 2:3-hydroxynaphthoic acid of the general formula

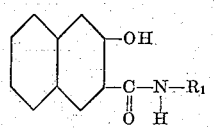

in which $R_1$ stands for a nucleus of the benzene series, with a diazo-compound obtained by diazotizing an arylether of the general formula

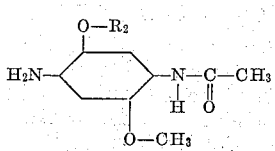

in which $R_2$ stands for a nucleus of the benzene series.

5. A process for the manufacture of new azo-dyestuffs, consisting in coupling an arylide of 2:3-hydroxynaphthoic acid of the general formula

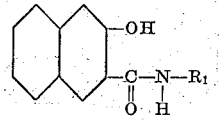

in which $R_1$ stands for a nucleus of the benzene series, with a diazo-compound obtained by diazotizing an arylether of the formula

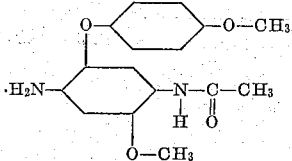

6. A process for the manufacture of new azo-dyestuffs, consisting in coupling an arylide of 2:3-hydroxynaphthoic acid of the general formula

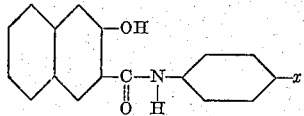

in which $x$ stands for a substituent of a group consisting of H, $CH_3$ or $O-CH_3$, with a diazo-compound obtained by diazotizing an arylether of the formula

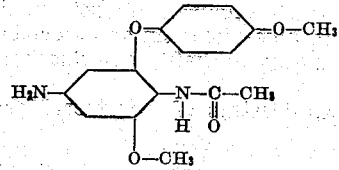

7. A process for the manufacture of a new azo-dyestuff, consisting in coupling an arylide of 2:3-hydroxynaphthoic acid of the formula

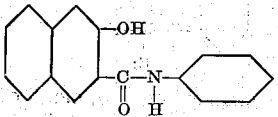

with a diazo-compound obtained by diazotizing an arylether of the formula

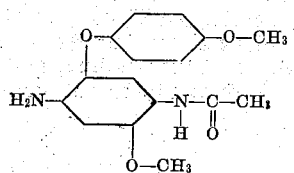

8. A process for the manufacture of a new azo-dyestuff, consisting in coupling an arylide of 2:3-hydroxynaphthoic acid of the formula

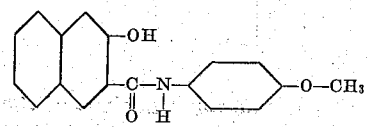

with a diazo-compound obtained by diazotizing an arylether of the formula

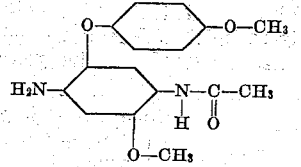

9. The azo-dyestuffs of the general formula

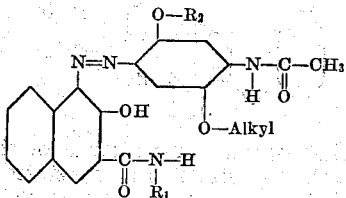

in which $R_1$ stands for a nucleus of the benzene or naphthalene series, and $R_2$ for a nucleus of the benzene series, which dyestuffs in a dry state form dark powders, dissolve in pyridine to violet solutions, and, when produced on cotton, dye this fibre violet to blue-violet tints of excellent fastness, particularly to light, chlorine and kier-boiling.

10. The azo-dyestuffs of the general formua

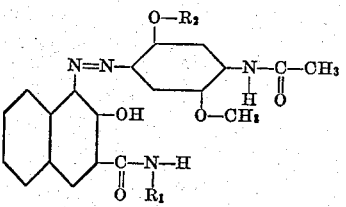

in which $R_1$ stands for a nucleus of the benzene or naphthalene series, and $R_2$ for a nucleus of the benzene series, which dyestuffs in a dry state form dark powders, dissolve in pyridine to violet solutions, and, when produced on cotton, dye this fibre violet to blue-violet tints of excellent fastness, particularly to light, chlorine and kier-boiling.

11. The azo-dyestuffs of the general formula

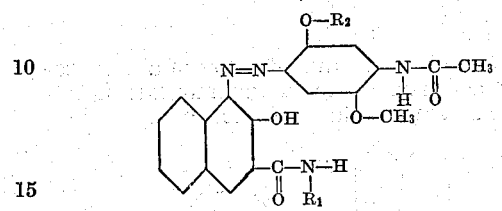

in which $R_1$ stands for a nucleus of the benzene series and $R_2$ for a nucleus of the benzene series, which dyestuffs in a dry state form dark powders, dissolve in pyridine to violet solutions, and, when produced on cotton, dye this fibre violet to blue-violet tints of excellent fastness, particularly to light, chlorine and kier-boiling.

12. The azo-dyestuffs of the general formula

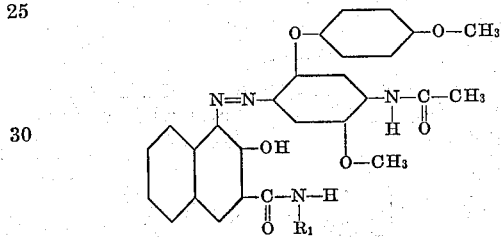

in which $R_1$ stands for a nucleus of the benzene series, which dyestuffs in a dry state form dark powders, dissolve in pyridine to violet solutions, and, when produced on cotton, dye this fibre violet to blue-violet tints of excellent fastness, particularly to light, chlorine and kier-boiling.

13. The azo-dyestuffs of the general formula

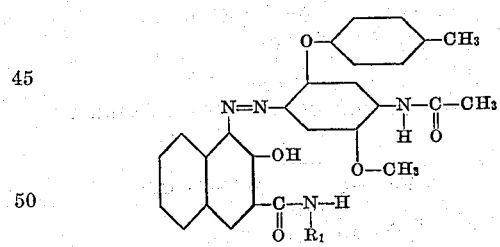

in which $R_1$ stands for a nucleus of the benzene series, which dyestuffs in a dry state form dark powders, dissolve in pyridine to violet solutions, and, when produced on cotton, dye this fibre violet to blue-violet tints of excellent fastness, particularly to light, chlorine and kier-boiling.

14. The azo-dyestuffs of the general formula

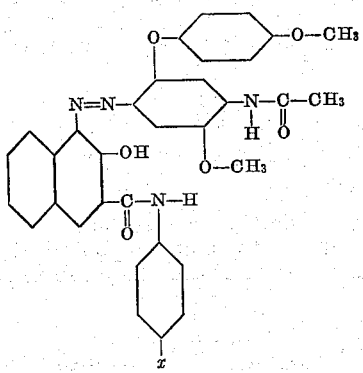

in which $x$ stands for a substituent of a group consisting of H, $CH_3$ or $O-CH_3$, which dyestuffs in a dry state form dark powders, dissolve in pyridine to violet solutions, and, when produced on cotton, dye this fibre violet to blue-violet tints of excellent fastness, particularly to light, chlorine and kier-boiling.

15. The azo-dyestuff of the formula

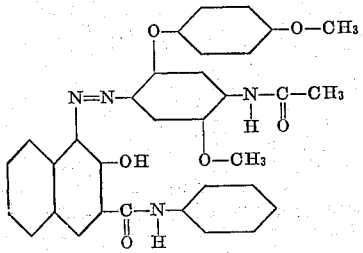

which dyestuff forms in a dry state a dark powder, dissolves in pyridine to a violet solution, and, when produced on cotton, dyes this fibre violet tints of excellent fastness, particularly to light, chlorine and kier-boiling.

16. The azo-dyestuff of the formula

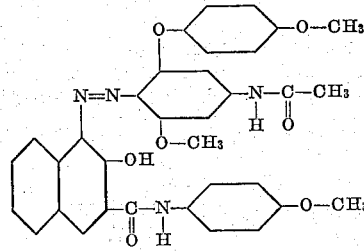

which dyestuff forms in a dry state a dark powder, dissolves in pyridine to a violet solution, and, when produced on cotton, dyes this fibre blue-violet tints of excellent fastness, particularly to light, chlorine and kier-boiling.

GÉRALD BONHÔTE.